United States Patent
Shimizu

(10) Patent No.: US 8,683,580 B2
(45) Date of Patent: Mar. 25, 2014

(54) IMAGE FORMING APPARATUS, IMAGE FORMING SYSTEM, AND AUTHENTICATION DEVICE

(75) Inventor: Takeo Shimizu, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 91 days.

(21) Appl. No.: 13/212,511

(22) Filed: Aug. 18, 2011

(65) Prior Publication Data

US 2012/0054855 A1 Mar. 1, 2012

(30) Foreign Application Priority Data

Aug. 27, 2010 (JP) ................................. 2010-190542

(51) Int. Cl.
*G06F 21/00* (2013.01)

(52) U.S. Cl.
USPC ............. 726/19; 380/247; 380/248; 380/249; 380/250; 713/155; 713/156; 713/157; 713/158; 713/159

(58) Field of Classification Search
None
See application file for complete search history.

(56) References Cited

U.S. PATENT DOCUMENTS

| | | | |
|---|---|---|---|
| 5,970,218 A | 10/1999 | Mullin et al. | |
| 2006/0001907 A1* | 1/2006 | Kumagai | 358/1.15 |
| 2007/0140557 A1* | 6/2007 | Osada | 382/167 |
| 2008/0201771 A1* | 8/2008 | Ueda | 726/7 |
| 2008/0244712 A1* | 10/2008 | Kitada et al. | 726/5 |

FOREIGN PATENT DOCUMENTS

| | | |
|---|---|---|
| JP | 09-319448 | 12/1997 |
| JP | 2005-141549 | 6/2005 |
| JP | 2007-228209 | 9/2007 |
| JP | 2009-271751 A | 11/2009 |

OTHER PUBLICATIONS

English translation of JP 09-319448.
English translation of JP 2005-141549.
English translation of JP 2007-228209.
English Machine Translation for JP 2009-271751.
Notice of Reasons for Rejection issued to JP Application No. 2010-190542 mailed Jan. 9, 2013.

* cited by examiner

*Primary Examiner* — Ghazal Shehni

(57) ABSTRACT

An image forming apparatus includes: an authentication unit that can execute a login process and a logout process; an operation unit that receives an instruction for the logout process from the user; a user attribute storage unit that stores the identification information of a non-logged-out user; a determination unit that determines whether a logged-in user, who is a user for whom the login process is executed by the authentication unit, is the non-logged-out user, based on the identification information stored in the user attribute storage unit; and a forced logout processing unit that, in a case in which the logged-in user is determined to be the non-logged-out user by the determination unit, instructs the authentication unit to execute the logout process when a predefined particular process among the plurality of processes is executed and completed by the processing unit.

9 Claims, 6 Drawing Sheets ary. In addition, in
IMAGE FORMING APPARATUS, IMAGE FORMING SYSTEM, AND AUTHENTICATION DEVICE This application is based on and claims the benefit of priority from Japanese Patent Application No. 2010-190542, filed on 27 Aug. 2010, the content of which is incorporated herein by reference.

BACKGROUND OF THE INVENTION

1. Field of the Invention

The present invention relates to an image forming apparatus and an image forming system with a user authentication function, as well as an authentication device.

2. Related Art

Recently, multifunction peripherals (MFP) having functions of scanner, facsimile machine, printer, copy machine and the like are used in offices and the like. Such multifunction peripherals are often used in a state of being connected to an information processing terminal such as a personal computer via a network such as a LAN (Local Area Network). The multifunction peripherals function as: an image forming apparatus that prints image data inputted from the information processing terminal on paper; an image reading apparatus that obtains image data used in the information processing terminal; and a document management apparatus that accumulates document image data so as to be searchable.

Such image data outputted from the information processing terminal and inputted to the multifunction peripheral for printing may be highly confidential and may require protection from prying. In addition, in an environment in which a plurality of information processing terminals are connected to a multifunction peripheral, the information processing terminals are often installed away from the multifunction peripheral. Therefore, in a case in which the information processing terminal instructs the multifunction peripheral to print highly confidential image data, there is a possibility that printed matter outputted by the multifunction peripheral may be seen and taken away by other users of the multifunction peripheral.

In view of such a situation, a multifunction peripheral having a private printing function is proposed (Related Art 1). In Related Art 1, in order to perform private printing, a user submits image data along with a password to the multifunction peripheral from the user's information processing terminal. Next, the user moves to a location of the multifunction peripheral, where the user logs in to and instructs the multifunction peripheral to execute a printing job of the image data submitted in advance. In response to the user's instruction, the multifunction peripheral prompts the user to input the password that is set to the printing job. When the user inputs the password to the multifunction peripheral, the multifunction peripheral executes the printing job.

In such a multifunction peripheral having an authentication function for confirming the user's usage permission, if the user leaves the multifunction peripheral without logging out, there is a possibility that other people not having usage permission may use the multifunction peripheral. In addition, in a case in which the multifunction peripheral has a document management function, there is a danger that highly confidential document image data accumulated in the multifunction peripheral may be seen by a third party. In particular, printing jobs for private printing as described above are stored in a document box accessible to the user. The document box is password-protected from access by other users having usage permission for the multifunction peripheral. If a user forgets to log out with such a configuration, other printing jobs remaining in the box will not be executed as long as the password is unknown; however, other data in the document box of the user is accessible to anyone.

Various proposals have been made in order to address a situation where a user forgets to log out. For example, a technology is disclosed for automatically logging out upon the elapse of a predefined expected operation period and an input standby period (Related Art 2). In addition, for a function of forced logout in a case in which a user does not perform any operation for a predetermined time period (auto-logout period), a technology is disclosed for managing the auto-logout period for each user and reducing the auto-logout period for users to whom an auto-logout function has been activated (Related Art 3). Furthermore, a technology is disclosed for reserving a predetermined job and automatically logging out upon completion of the reserved job (Related Art 4).

However, the abovementioned techniques for preventing forgetting to logout are not satisfactory due to the following problems.

In the technology disclosed in Related Art 2, due to automatic logout upon elapse of the predefined expected operation period and the input standby period, a user may be logged out during operation, if the user takes time to perform the operation for some reason. This forces the user to log in again and repeat the operation from the beginning. Such a situation reduces operability and therefore is not preferable.

In the technology disclosed in Related Art 3, a user with a reduced auto-logout period may be logged out during operation if the user does not smoothly perform operations. Recent multifunction peripherals have a variety of functions, some of which are rarely used by users. In a case of using such functions, users cannot necessarily smoothly perform operations. As a result, the user may be forced to log out during operation and operability may be reduced as in the technology of Related Art 2.

The technology disclosed in Related Art 4 is cumbersome, since, on completion, a reservation must be made for the job of executing a logout process. Especially in a case of successively performing a plurality of jobs, an assumption must be made for the last job and, if the order of jobs is changed, a user may be logged out during operation. Although Related Art 4 discloses a configuration in which a reservation is made during processing of a job, if a user forgets the reservation, forgetting to logout cannot be prevented.

SUMMARY OF THE INVENTION

An objective of the present invention is to provide an image forming apparatus that can prompt execution of a logout operation by a user without compromising confidentiality.

Another objective of the present invention is to provide an image forming system that can prompt execution of a logout operation by a user without compromising confidentiality.

Yet another objective of the present invention is to provide an authentication device that can prompt execution of a logout operation by a user without compromising confidentiality.

The present invention relates to an image forming apparatus including: a processing unit (image forming unit) that executes a plurality of processes;

an identification information input unit in which identification information for identifying a user is input;

an authentication unit that can execute a login process and a logout process, the authentication unit executing the login process in a case in which the identification information input through the identification information input unit fulfills a predefined authentication condition;

an operation unit that receives an instruction for the logout process from the user;

a user attribute storage unit that stores the identification information of a non-logged-out user, who is a particular user among users that have not given the instruction for the logout process through the operation unit;

a determination unit that determines whether a logged-in user, who is a user for whom the login process is executed by the authentication unit, is the non-logged-out user, based on the identification information stored in the user attribute storage unit; and a forced logout processing unit that, in a case in which the logged-in user is determined to be the non-logged-out user by the determination unit, instructs the authentication unit to execute the logout process when a predefined particular process among the plurality of processes is executed and completed by the processing unit.

The present invention relates to an image forming system including: a processing device that executes a plurality of processes;

an identification information input device in which identification information for identifying a user is input; and an authentication device including:

an authentication unit that can execute a login process and a logout process, the authentication unit executing the login process in a case in which the identification information input through the identification information input device fulfills a predefined authentication condition;

an operation unit that receives an instruction for the logout process from the user;

a user attribute storage unit that stores identification information of a non-logged-out user, who is a particular user among users that have not given the instruction for the logout process through the operation unit;

a determination unit that determines whether a logged-in user, who is a user for whom the login process is executed by the authentication unit, is the non-logged-out user based on the identification information stored in the user attribute storage unit; and a forced logout processing unit that, in a case in which the logged-in user is determined to be the non-logged-out user by the determination unit, instructs the authentication unit to execute the logout process when a predefined particular process among the plurality of processes is executed and completed by the processing device.

The present invention relates to an authentication device including: an identification information input unit in which identification information for identifying a user is input;

an authentication unit that can execute a login process and a logout process, the authentication unit executing the login process in a case in which the identification information input through the identification information input unit fulfills a predefined authentication condition;

an operation unit that receives an instruction for the logout process from the user;

a user attribute storage unit that stores the identification information of a non-logged-out user, who is a particular user among users that have not given the instruction for the logout process through the operation unit;

a determination unit that determines whether a logged-in user, who is a user for whom the login process is executed by the authentication unit, is the non-logged-out user, based on the identification information stored in the user attribute storage unit; and a forced logout processing unit that, in a case in which the logged-in user is determined to be the non-logged-out user by the determination unit, instructs the authentication unit to execute the logout process when a predefined particular process among the plurality of processes is executed and completed by an apparatus subjected to authentication.

DETAILED DESCRIPTION OF THE INVENTION

Embodiments of the present invention are described in detail hereinafter with reference to the drawings. A digital multi-function peripheral is described hereinafter as a concrete example of the present invention.

Figure 1:
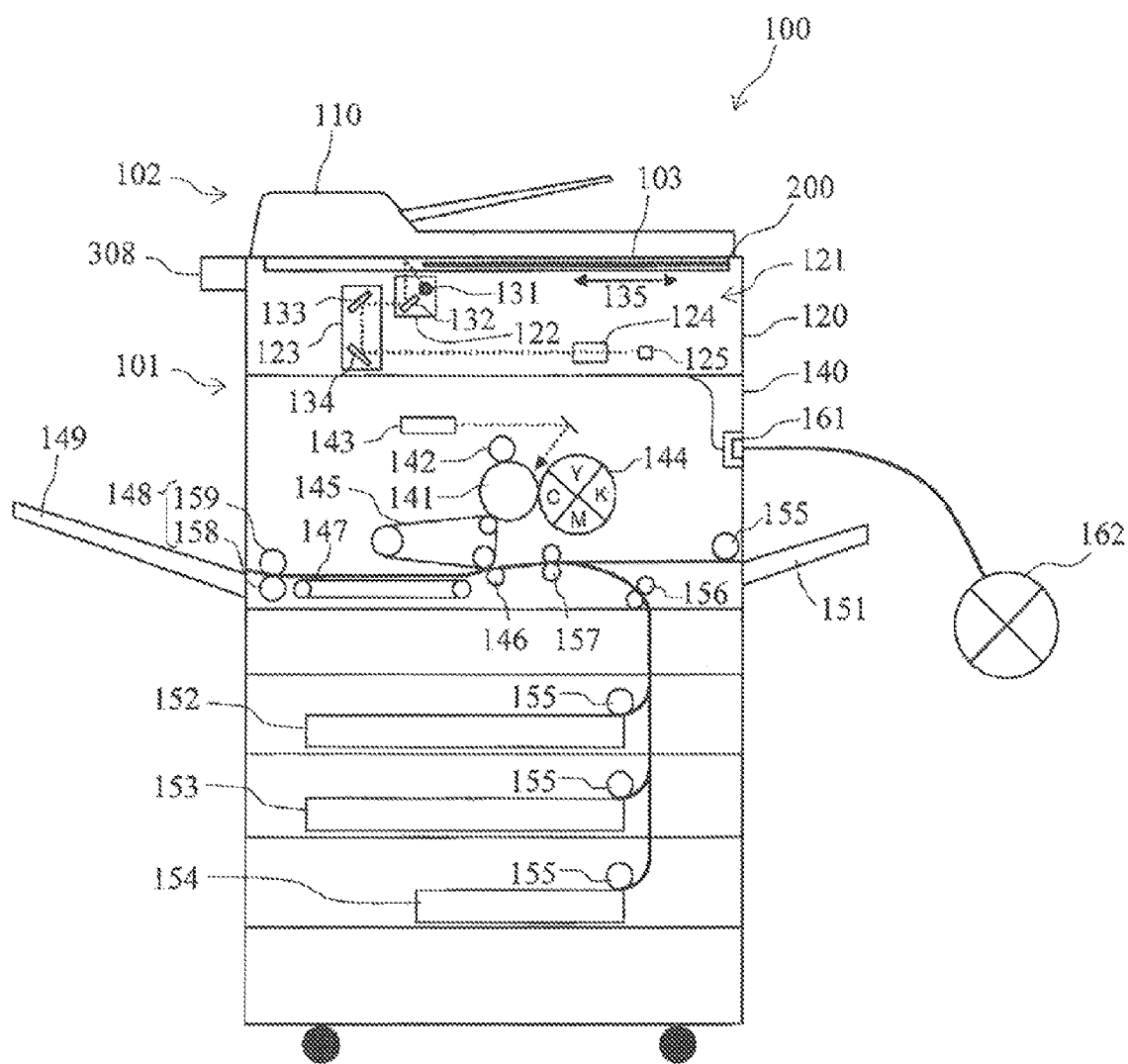
FIG. 1 is a schematic configuration diagram showing an overall configuration of a multifunction peripheral according to an embodiment of the present invention.

FIG. 1 is a schematic configuration diagram showing an example of an overall configuration of a digital multifunction peripheral according to the present embodiment. As shown in FIG. 1, a multifunction peripheral 100 is provided with: a main body 101 including an image reading unit 120 and an image forming unit 140 (processing unit, processing device); and a platen cover 102 attached to an upper side of the main body 101. A platen 103 is provided on an upper face of the main body 101, the platen 103 being opened and closed by the platen cover 102. The platen cover 102 is provided with an original feeder 110.

The image reading unit 120 is provided below the platen 103. The image reading unit 120 reads an image of an original by means of a scanning optical system 121 and generates digital data of the image thus read. The original can be placed on the platen 103 or the original feeder 110. The scanning optical system 121 is provided with a first carriage 122, a second carriage 123, and a condensing lens 124. The first carriage 122 includes a linear light source 131 and a mirror 132. The second carriage 123 includes mirrors 133 and 134. The light source 131 illuminates the original. The mirrors 132, 133 and 134 guide reflected light (optical image) from the original to the condensing lens 124. The condensing lens 124 forms an optical image on an acceptance surface of a line image sensor 125. In the scanning optical system 121, the first carriage 122 and the second carriage 123 are provided so as to be reciprocatable in a sub-scanning direction 135.

In a case of scanning an image of the original placed on the platen 103, the image reading unit 120 moves the first carriage 122 and the second carriage 123 in the sub-scanning direction 135 in order to make the optical image of an image of an entire original incident onto an acceptance surface of the image sensor 125, thereby reading an image of the original.

In a case of scanning an image of the original placed on the original feeder 110, the image reading unit 120 temporarily fixes the first carriage 122 and the second carriage 123 at an image reading position, and then the image sensor 125 scans an image of the original passing through the image reading position.

The image sensor 125 generates image data of the original corresponding to each color of R (red), G (green) and B (blue), for example, from the optical image incident on the acceptance surface.

The image forming unit 140 forms (prints) an image on a surface of paper, based on the image data obtained by the image reading unit 120 or received from other devices (not shown) connected to a network 162, via a network adaptor 161. The image forming unit 140 includes a photoreceptor drum 141. The photoreceptor drum 141 rotates in one direction at a constant speed. In the periphery of the photoreceptor drum 141, a charging device 142, an exposure device 143, a developing device 144, and an intermediate transfer belt 145 are disposed. The charging device 142 uniformly charges a surface of the photoreceptor drum 141. The exposure device 143 irradiates the surface of the photoreceptor drum 141 uniformly charged with light according to the image data, thereby forming an electrostatic latent image on the photoreceptor drum 141. The developing device 144 deposits toner on the electrostatic latent image, thereby forming a toner image on the photoreceptor drum 141. The intermediate transfer belt 145 transfers the toner image on the photoreceptor drum 141 to the paper.

In a case where the image data is data of a color image, the intermediate transfer belt 145 transfers toner images of respective colors on the same paper. The color image in the RGB format is transferred into image data of C (cyan), M (magenta), Y (yellow) and K (black), and the image data of these colors is input to the exposure device 143.

The image forming unit 140 feeds the paper from a manual feeding tray 151, paper feeding cassettes 152, 153 and 154, and the like to the transfer portion between the intermediate transfer belt 145 and a transfer roller 146. The manual feeding tray 151 and the paper feeding cassettes 152, 153 and 154 carry or house various sizes of paper. The image forming unit 140 selects the paper specified by a user or the paper corresponding to a size of original automatically detected, and then pulls the paper thus selected out from the manual feeding tray 151 and the paper feeding cassettes 152, 153 and 154. The paper thus pulled out is fed to the transfer portion by the transfer roller 156 and the resist roller 157. The paper onto which the toner image is transferred is then fed to a fixing device 148 by a paper feeding belt 147. The fixing device 148 includes a fixing roller 158 including a heater and a pressurizing roller 159, in order to fix the toner image onto the paper by heat and a pressing force. The image forming unit 140 ejects the paper having passed through the fixing device 148 to an ejected paper tray 149.

Figure 2:
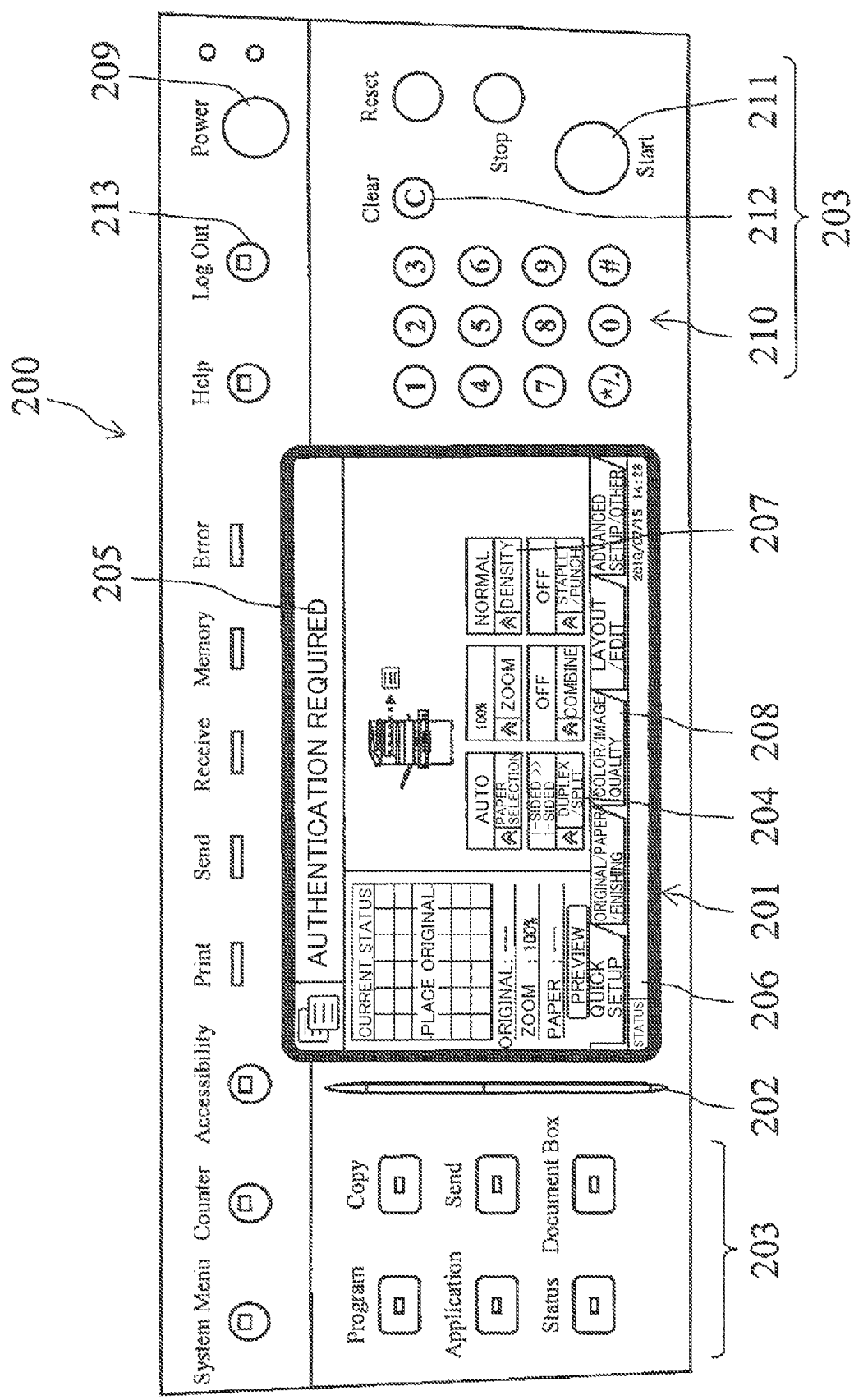
FIG. 2 is a schematic view showing an operation panel of the multifunction peripheral according to the embodiment of the present invention.

FIG. 2 is a diagram showing an example of an external appearance of the operation panel provided in the multi-function peripheral. A user can use the operation panel 200 to give an instruction of starting copying and the like to the multi-function peripheral 100, and to confirm a state and settings of the multi-function peripheral 100.

In the operation panel 200, a display with touch panel 201 and an operation key 203 are disposed. The display with touch panel 201 is provided with a display face that is composed of a liquid crystal display or the like and displays operation buttons and messages, and a sensor that detects a pressed position on the display face. A method for detecting the pressed position is not particularly limited and can be accordingly selected from, for example: a resistance film method; a capacitance method; a surface acoustic wave method; an electromagnetic wave method; and the like. A user can perform input through the display 201, using the user's fingers or a stylus 202.

The display with touch panel 201 displays the operation screen including a button display portion 204, a message display portion 205, and a status display portion 206. In the button display portion 204, a plurality of tabs 208 are displayed. Upon selection of each tab, the display with touch panel 201 displays operation buttons corresponding to a category of the tab.

Upon selection of a "Quick Setup" tab, the display with touch panel 201 arranges and displays operation buttons used for basic settings. In the example shown in FIG. 2, operation buttons are arranged for setting paper size, zoom, density, duplex copying, combine, and post processing. For example, if a user presses the "Density" button 207, a pop-up screen is superimposed thereon showing selection buttons for selecting density such as "Light", "Normal", "Dark" and the like. If the user selects (presses) any of the buttons, the density thereof is set.

In the example of FIG. 2, in addition to the "Quick Setup" tab, an "Original/Paper/Finishing" tab, a "Color/Image Quality" tab, a "Layout/Edit" tab, and an "Advanced Setup/Other" tab are provided. Upon selection of the tabs 208 by a user, screens corresponding to these tabs, displaying selection buttons, are switched from one to another. Here, while a screen, in which selection buttons are arranged, corresponding to a selected tab is displayed, selection buttons and the like for other tabs are not displayed (hidden) on the operation screen.

The message display portion 205 displays messages for notifying a user of: availability of copy function; settings such as copy quantity; guidance information of operation; and the like. FIG. 2 shows a state before executing a login process (authentication process) in an authentication unit (described later), in which the message display portion 205 displays a guidance message "Authentication Required" explaining the state and prompting the user's operation.

In the status display portion 206, apparatus status information is displayed as necessary. The status display portion 206 displays apparatus status information that reflects detection results of various sensors provided in the multi-function peripheral 100. In the present embodiment, the apparatus status information is a message for prompting the user to deal with an abnormality, in a state in which the apparatus is still operable despite the abnormality. The apparatus status information includes, for example: low remaining amount of paper; the platen 103 being dirty; facsimile document being stored in memory (in a case where receipt of facsimile by memory being set); and the like. Paper out, paper jam and the like can also be included in the apparatus status information.

The operation key 203 includes: a main power key 209; a numerical keypad 210; a start key 211; a clear key 212; a logout key 213, and the like.

The main power key 209 is used for turning on and off the main power of the multi-function peripheral 100.

The numerical keypad 210 is used for setting of copy quantity and zoom. When a user makes a setting thereof using the numerical keypad 210, the multifunction peripheral 100 displays a message such as "Ready to Copy (With Settings)" on the message display portion 205, thereby notifying that user setting has been performed.

The start key 211 is used for instructing the apparatus to start coping or printing.

The clear key 212 is used for, for example, clearing settings that were made by using the numerical keypad 210. For example, the clear key 212 is used by a user to clear settings made by the user. Settings by a user, which are displayed in the message, can be cleared by operating the clear key 212 when the settings are no longer needed. Although there is no particular limitation, in the present embodiment, the multifunction peripheral is configured such that input to the operation panel 200 is disabled until the authentication unit (described later) fulfills authentication conditions that are defined in advance.

The logout key 213 is used to clear a logged-in state of a logged-in user (described later) in the multifunction peripheral 100. For example, if a user authenticated by the authentication unit (described later) presses the logout key 213 after using the multifunction peripheral, the multifunction peripheral 100 returns to a state before the login process. Here, in the present embodiment, the multifunction peripheral 100 is configured to return to the state before the login process not only in a case in which the user presses the logout key 213, but also in a case in which a predetermined time period elapses without a user operation on the operation panel 200 and operation of the image reading unit 120 and the image forming unit 140.

Figure 3:
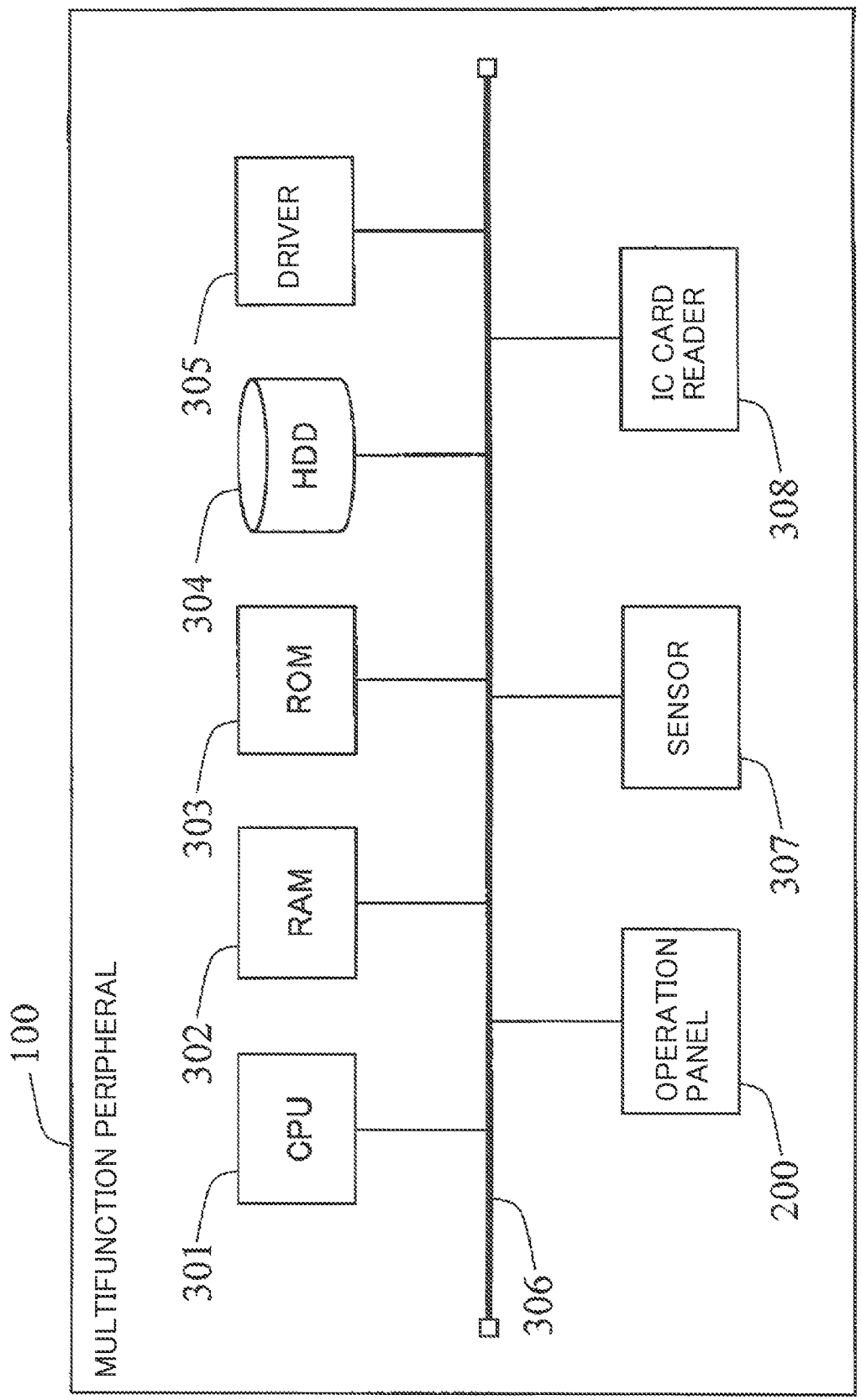
FIG. 3 is a diagram showing a hardware configuration of the multifunction peripheral according to the embodiment of the present invention.

FIG. 3 is a hardware configuration diagram of a control system of the multi-function peripheral. In the multi-function peripheral 100 of the present embodiment: a CPU (Central Processing Unit) 301; RAM (Random Access Memory) 302; ROM (Read Only Memory) 303; and a HDD (Hard Disk Drive) 304; the original feeder 110; the image reading unit 120; and a driver 305 corresponding to each driving unit in the image forming unit 140 are connected to each other via an internal bus 306.

The ROM 303, the HDD 304 and the like store programs. The CPU 301 controls the multi-function peripheral 100 according to an instruction of a control program thus stored. For example, the CPU 301 controls operation of the each driving unit by using the RAM 302 as a work area. The HDD 304 is used for accumulating image data obtained by the image reading unit 120 and image data received from other devices via the network adaptor 161.

To the internal bus 306, the operation panel 200 and the various sensors 307 are connected.

The operation panel 200 accepts a user's operation and supplies a signal based thereon to the CPU 301. The display 201 displays the abovementioned operation screen according to a control signal from the CPU 301.

The sensors 307 include: an opening/closing sensor of the platen cover 102; an original sensor on the platen 103; a temperature sensor of the fixing device 148; a sensor for the paper or original being fed; and the like.

The CPU 301 realizes the following unit (function blocks) by executing programs stored in the ROM 303, for example, and controls operation of the unit based on a signal from a sensor.

An IC card reader reads identification information of a user stored in an IC card belonging to the user. Thereafter, an authentication unit 402 executes the login process based on the identification information.

Figure 4:
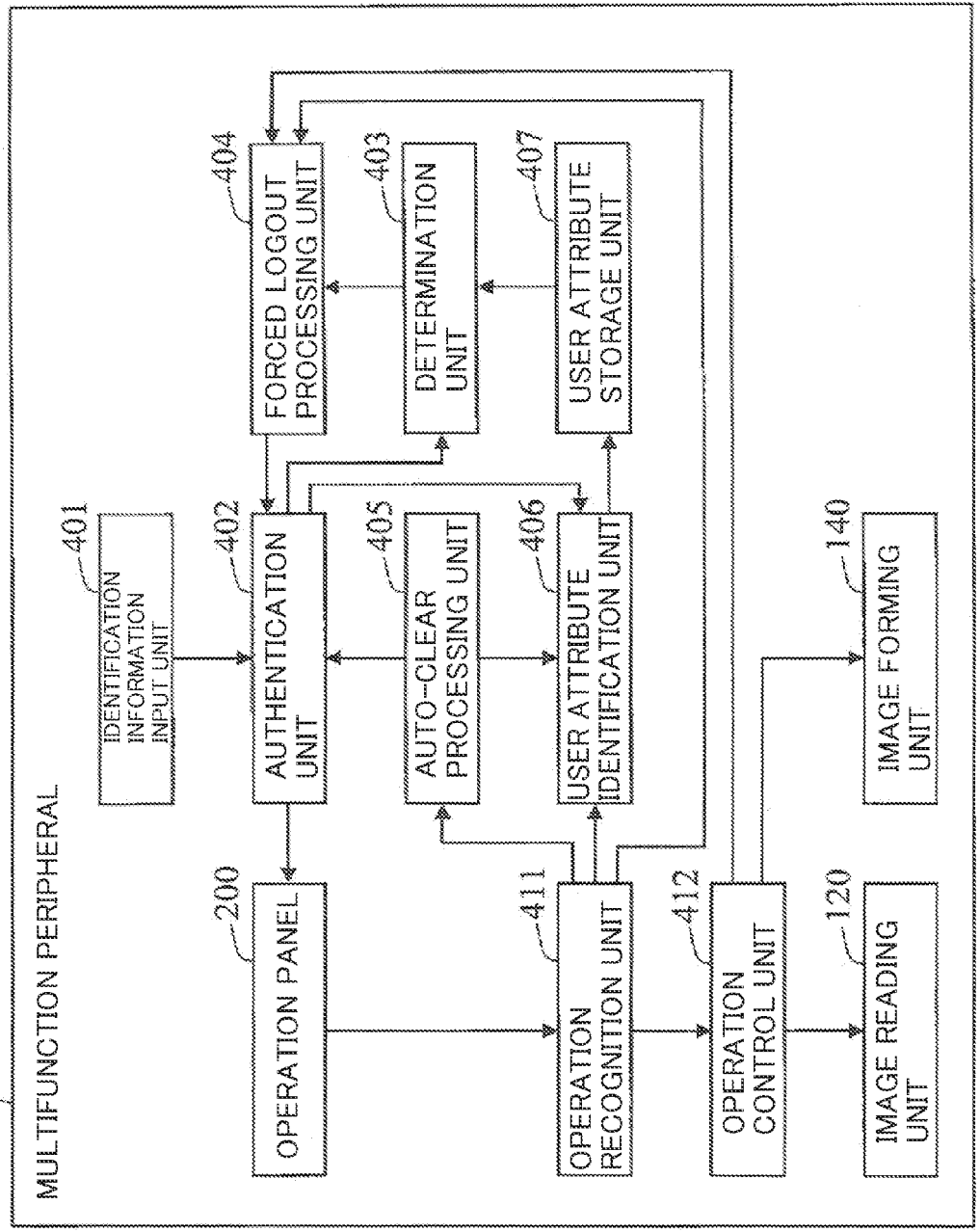
FIG. 4 is a function block diagram showing the multifunction peripheral according to the embodiment of the present invention.

FIG. 4 is a function block diagram of the multi-function peripheral of the present embodiment. As shown in FIG. 4, the multifunction peripheral 100 of the present embodiment includes: an identification information input unit 401; an authentication unit 402; a determination unit 403; and a forced logout processing unit 404.

The identification information input unit 401 is used for inputting identification information for identifying a user. In the present embodiment, the identification information input unit 401 is composed of an IC card reader 308. When the IC card, which is a portable storage medium, is placed on a reading position of the IC card reader 308, the IC card reader 308 reads the identification information of a user stored in the IC card. The identification information can be any information that can identify a user. For example, a user ID assigned to each user can be used as the identification information. In addition, other portable storage media such as a magnetic card and USB (Universal Serial Bus) memory can be used instead of the IC card. In such a case, the identification information input unit 401 has a configuration corresponding to the portable storage media (a magnetic card reader, an USB interface, or the like). Alternatively, the multifunctional peripheral can be configured such that user identification information is input using a software keyboard displayed on the touch display 201 or the numerical keypad 210 as the identification information input unit 401. In such a case, the operation panel 200 is configured to allow input of at least the user identification information.

The authentication unit 402 checks the identification information that has been input through the identification information input unit 401 against an authentication condition that has been defined (registered) in advance. In the present embodiment, an accessible user list storing identification information (for example, user ID) of users who are allowed to use the multifunction peripheral 100 is registered in advance in the authentication unit 402. If identification information (for example, a user ID) that the identification information input unit 401 has obtained is included in the accessible user list, the authentication unit 402 determines that the authentication condition is fulfilled.

The authentication unit 402 executes the login process and allows the user to use the multifunction peripheral 100 (generating image data in the image reading unit 120, printing the image data in the image forming unit 140, and the like), if the authentication condition is fulfilled. Once the authentication unit 402 has executed the login process, the multifunction peripheral 100 is in a logged-in state.

The authentication unit 402 does not execute the login process and restricts access to the multifunction peripheral 100 in a case in which the authentication condition is not fulfilled. Although there is no particular limitation, in the present embodiment, access to the multifunction peripheral 100 is restricted by not accepting an operation through the operation panel 200 until the authentication condition is fulfilled.

In addition, the authentication unit 402 executes the logout process that clears the logged-in state.

The authentication unit 402 executes the logout process in response to a predetermined signal (instruction) after the login process.

The authentication unit 402 executes the logout process in response to, for example, a signal from the logout key 213.

In addition, the authentication unit 402 executes the logout process for clearing the logged-in state, based on instructions from the forced logout processing unit 404 and an auto-clear processing unit 405 (described later).

After the logout process, the authentication unit 402 restricts access to the multifunction peripheral 100. The authentication unit 402 restricts execution of processes by executing the logout process.

In the present embodiment, the authentication unit 402 outputs identification information to the determination unit 403 and the user attribute identification unit 406.

In addition, in the present embodiment, the authentication unit 402 outputs information relating to an execution state of the login process and the logout process to the determination unit 403, the user attribute identification unit 406, and the operation panel 200.

The determination unit 403 determines whether or not the logged-in user, who is a user for whom the login process was executed by the authentication unit 402, is the non-logged-out user who did not perform the logout process. In the present embodiment, the determination unit 403 determines whether the logged-in user, for whom the login process has been performed by the authentication unit 402, is the non-logged-out user based on the information stored in the user attribute storage unit 407 (described later).

More specifically, the determination unit 403 determines whether the logged-in user is the non-logged-out user based on the information stored in the user attribute storage unit 407 and the identification information of the logged-in user, for whom the login process has been performed by the authentication unit 402.

More particularly, in the present embodiment, the determination unit 403 checks whether information showing the non-logged-out user is associated with the identification information of the logged-in user in the user attribute storage unit 407. In a case in which the information showing the non-logged-out user is associated with the identification information of the logged-in user, the determination unit 403 determines that the logged-in user is the non-logged-out user, and in a case in which the information showing the non-logged-out user is not associated thereto, the determination unit 403 determines that the logged-in user is not the non-logged-out user.

The forced logout processing unit 404, in a case in which the logged-in user is determined to be the non-logged-out user by the determination unit 403, instructs the authentication unit 402 to execute the logout process when a predefined (for example, pre-registered) particular process among the processes executed by the multifunction peripheral 100 is executed and completed.

The particular process is, for example, a process that needs a security procedure by requiring a password for executing the process and the like, such as a private printing process and access to a document box.

In the present embodiment, the forced logout processing unit 404 monitors processes executed by an operation control unit 412 (described later). Thereafter, the forced logout processing unit 404 instructs the authentication unit 402 to execute the logout process upon completion of the pre-registered particular process. In response to the instruction, the authentication unit 402 executes the logout process for clearing the logged-in state of the logged-in user.

In addition, the multifunction peripheral 100 of the present embodiment includes: the auto-clear processing unit 405, the user attribute identification unit 406, the user attribute storage unit 407, an operation recognition unit 411, and the operation control unit 412.

The auto-clear processing unit 405 monitors operations by the logged-in user through the operation recognition unit 411 (described later), and instructs the authentication unit 402 to execute the logout process when a predetermined specific time period has elapsed without an input to the operation panel 200 (operation unit).

The auto-clear processing unit 405 monitors operations by the user through the operation recognition unit 411 (described later in detail), and instructs the authentication unit 402 to execute the logout process when the predetermined specific time period (hereinafter referred to as auto-clear period), in which the logged-in user does not perform any operation, has elapsed. In response to the instruction, the authentication unit 402 executes the logout process for clearing the logged-in state of the logged-in user. As a result, the multifunction peripheral 100 returns to a state before the login process. Here, the auto-clear processing unit 405 puts the multifunction peripheral 100 into a default state by clearing all settings such as copy quantity, zoom and the like, that have been made by the logged-in user through the numerical keypad 210 and the like.

The user attribute identification unit 406 identifies the non-logged-out user based on a processing status and an operation status of the multifunction peripheral 100.

The user attribute identification unit 406 detects whether or not a logged-in state exists, which user has performed an operation, and the content of operations performed by respective users, based on the identification information received from the authentication unit 402, the information relating to the login process and the logout process, and operation information received from the operation recognition unit 411.

In addition, the user attribute identification unit 406 detects that the auto-clear process has been executed, based on information received from the auto-clear processing unit 405.

The user attribute identification unit 406 identifies the non-logged-out user based on: information relating to a state of the login process and the logout process and identification information of the logged-in user from the authentication unit 402; information relating to an operation from the operation recognition unit 411; and information relating to execution of an auto-clear process from the auto-clear processing unit 405.

The user attribute identification unit 406 that identifies the logged-in user as the non-logged-out user:

after executing the login process by the authentication unit 402 and before executing the logout process is executed by the authentication unit 402 based on the instruction from the auto-clear processing unit 405, in a case in which a detected operation is performed by a user different from the logged-in user; and after executing the logout process by the authentication unit 402 based on the instruction from the auto-clear processing unit 405, identifies the logged-in user as the non-logged-out user in a case in which the identification information firstly input to the identification information input device 401 is the identification information for a user different from a user who was logged-in at the beginning of the logout process.

In the present embodiment, the user attribute identification unit 406, after executing the login process and before executing the logout process by the authentication unit 402, identifies the logged-in user as the non-logged-out user in a case in which an operation by a user different from the logged-in user is detected. An example of this situation is a case in which, after the login process executed by the authentication unit 402, the logged-in user leaves the multifunction peripheral 100 without instructing the logout process (for example, without pressing the logout key 213) and another user operates the multifunction peripheral 100 before the logout process by the authentication unit 402 based on the instruction from the auto-clear processing unit 405. Operation by another user includes, for example: the login process via the identification information input unit 401, access to a storage region exclusive for the other user (such as a document box in which output data is accumulated during private printing), and the like.

The user attribute identification unit 406, after the login process by the authentication unit 402 and after the logout process by the authentication unit 402 based on an instruction from the auto-clear processing unit 405, identifies the logged-in user as the non-logged-out user in a case in which the identification information of another user who is different from the logged-in user at the beginning of the logout process is input to the identification information input unit 401. An example of this situation is a case in which the logged-in user leaves the multifunction peripheral 100 without instructing the logout process (for example, without pressing the logout key 213) and another user operates the multifunction peripheral 100 after the logout process by the authentication unit 402 based on an instruction from the auto-clear processing unit 405. The user attribute identification unit 406, after the logout process by the authentication unit 402 based on an instruction from the auto-clear processing unit 405, does not identify the logged-in user as the non-logged-out user in a case in which the authentication unit 402 executes a re-login process in response to a predetermined operation performed by the logged-in user at the beginning of the logout process. This is because, in such a case, a situation can be assumed in which the auto-clear period has elapsed for some reason even when the user does not leave the multifunction peripheral 100.

The user attribute storage unit 407 stores a result of identification by the user attribute identification unit 406 in correspondence with the identification information. Although there is no particular limitation, in the present embodiment, the user attribute storage unit 407 retains the information in the form of a user attribute information table corresponding to all the identification information included in the accessible user list. In such a configuration, each user is registered as or not as a non-logged-out user, and the determination unit 403 confirms whether the user attribute assigned to the identification information input to the identification information input unit 401 indicates a non-logged-out user or not. Alternatively, the user attribute storage unit 407 can be configured to store only the identification information of non-logged-out users. In such a configuration, the determination unit 403 confirms whether the identification information input to the identification information input unit 401 is included in the user attribute information table or not.

The operation recognition unit 411 recognizes pressing of the operation key 203 of the operation panel 200 and pressure on the display 201 and recognizes operation by a user. Although there is no particular limitation, in the present embodiment, coordinates of a pressed position, which is detected by a sensor for detecting the pressed position on the display 201, is input to the operation recognition unit 411, and the operation recognition unit 411 recognizes the operation by the user based on coordinates of operation buttons arranged in the operation recognition unit 411 and the coordinates of the pressed position thus input.

The operation control unit 412 executes generation of image data in the image reading unit 120, printing of the image data in the image forming unit 140 and the like, based on a user's instruction via the operation panel 200, detected by the operation recognition unit 411.

Figure 5:
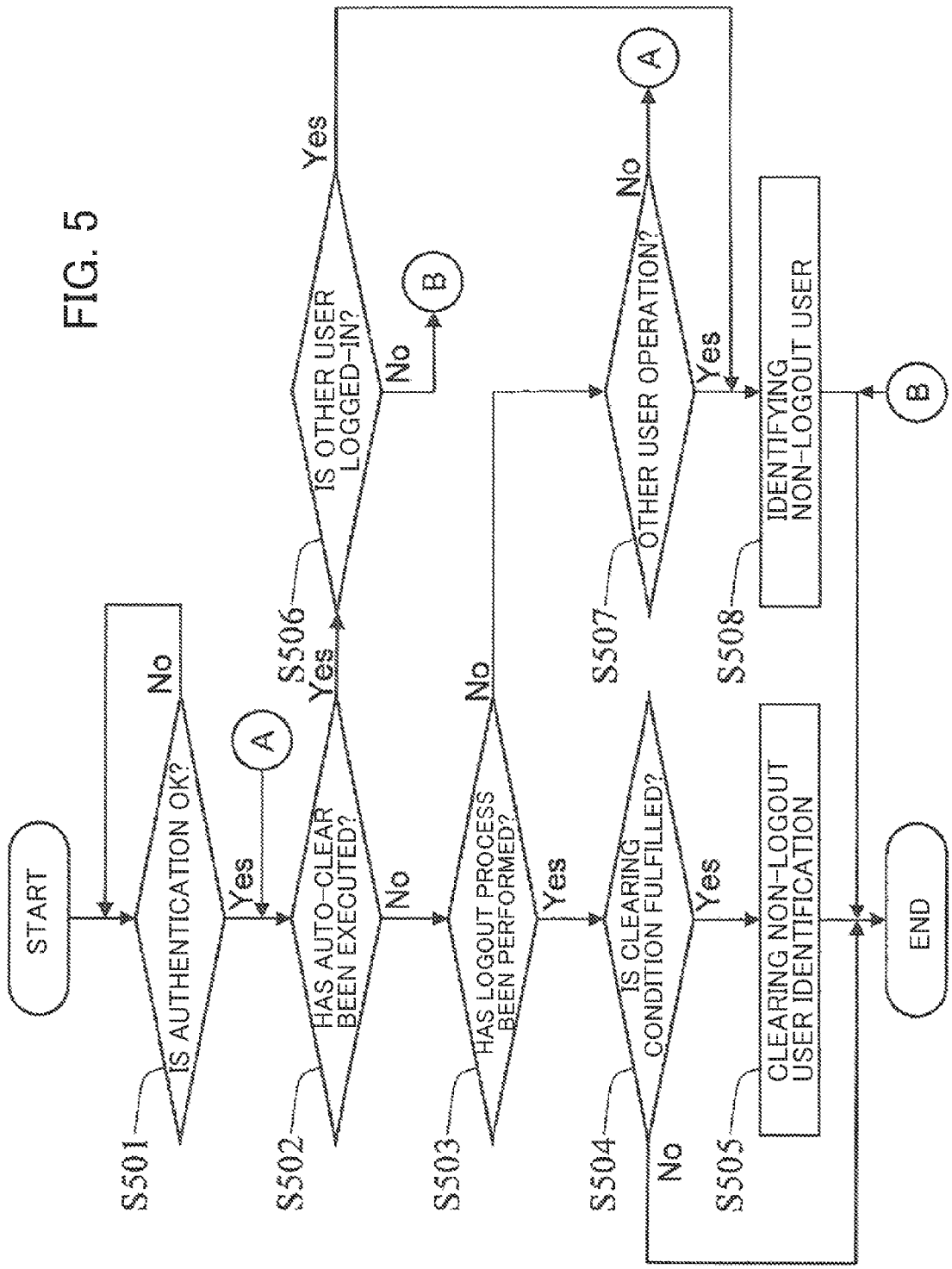
FIG. 5 is a flow diagram showing an example of a non-logged-out user identification procedure executed by the multifunction peripheral according to the embodiment of the present invention.

FIG. 5 is a flow diagram showing an example of a non-logged-out user identification procedure executed by the user attribute identification unit 406 of the multifunction peripheral 100. The procedure is triggered by, for example, acquisition of the identification information by the identification information input unit 401 (IC card reader 308) (Step S501 Yes).

Here, the authentication unit 402 determines whether the identification information (user ID) input from the identification information input unit 401 is included in the accessible user list or not. If the identification information (the user ID) thus input is included in the accessible user list, the authentication unit 402 executes the login process. The authentication unit 402 goes into a state of accepting operations by the user through the operation panel 200 (Step S501 Yes). In contrast, if the identification information thus input is not included in the accessible user list, the authentication unit 402 does not execute the login process. The authentication unit 402 is kept in a state of not accepting operations through the operation panel 200 (Step S501 No). In addition, if the identification information is included in the accessible user list, the authentication unit 402 inputs the identification information to the user attribute identification unit 406.

While the logged-in state of the authenticated user is maintained, the user attribute identification unit 406 monitors execution of the logout process by the authentication unit 402 based on an instruction from the auto-clear processing unit 405 (Step S502). Although there is no particular limitation, the present embodiment is configured such that, when the auto-clear processing unit 405 instructs the authentication unit 402 to execute the logout process, the auto-clear processing unit 405 notifies the execution to the user attribute identification unit 406.

In a case in which the logout process has not been executed by an instruction from the auto-clear processing unit 405, the user attribute identification unit 406 monitors a logout operation by the logged-in user (here, pressing on the logout key 213) (Step S502 No, S503). If the operation by another user, as described above, is detected while no logout operation is performed by the logged-in user, the logged-in user can be considered to be a user who does not perform the logout process. Given this, the user attribute identification unit 406 identifies the logged-in user as the non-logged-out user and the procedure terminates (Steps S503 No, S507 Yes and S508). The user attribute identification unit 406 can monitor the logout operation by the logged-in user and operations by other users through the operation recognition unit 411.

In a case in which the logout process has not been performed by the logged-in user and no operation by other users is detected, the user attribute identification unit 406 continues monitoring: the logout process by the instruction from the auto-clear processing unit 405; a logout operation by the logged-in user; and operation by other users (Step S507 No, S502 No, S503 No and S507).

On the other hand, in a case in which the logout process has been executed by the instruction from the auto-clear processing unit 405, the user attribute identification unit 406 monitors whether a user who performs the login process subsequently is the same as the user who has been logged in before the logout process (Step S502 Yes, S506). In a case in which the login process by the authentication unit 402 is executed as a result of a predetermined operation by another user who is not the user who has been logged in before the logout process, the user who has been logged in before the logout process executed by the instruction from the auto-clear processing unit 405 can be considered to be a user who does not perform the logout process by the user's own operation. Given this, the user attribute identification unit 406 identifies the user as a non-logged-out user and the procedure terminates (Steps S506 Yes and S508). In a case in which the logout process is executed by the instruction from the auto-clear processing unit 405 instead of another user, and the re-login process is executed as a result of a predetermined operation by a user who has been logged in before the logout process, it is possible that the logout process has been executed by an instruction from the auto-clear processing unit 405 due to a long time interval between operations for some reason. Given this, the user attribute identification unit 406 does not identify the user as the non-logged-out user and the procedure terminates (Step S506 No). The user attribute identification unit 406 can easily determine the same user and different users by comparing the identification information provided from the authentication unit 402.

In a case in which the logout process is executed by the authentication unit 402 as a result of a predetermined operation (for example, pressing the logout key 213) by the logged-in user while the logout process has not been executed by the instruction from the auto-clear processing unit 405, the user can be considered to be a user who performs the logout process by the user's own operation. Given this, the user attribute identification unit 406 does not identify the user as the non-logged-out user (Step S503 Yes).

In the present embodiment, the user attribute identification unit 406 is configured to execute a process of clearing identification of a non-logged-out user. In other words, since a user who performs the logout process by his/her own operation no longer needs identification as a non-logged-out user, the user attribute identification unit 406 clears the identification as the non-logged-out user (Step S505). Here, "5 consecutive executions of the logout process by a user's own operation" is registered as a condition for clearing identification as the non-logged-out user. As a result, when the user performs the logout process 5 consecutive times, the user attribute identification unit 406 changes the attribute information of the user in the attribute information table stored in the user attribute storage unit 407 to information indicating that this is not a non-logged-out user (S504 Yes, S505). In a case in which the number of logout processes does not reach a defined value, the user attribute identification unit 406 does not change the attribute information of the user in the attribute information table and the procedure terminates (S504 No).

Such a configuration can be easily realized by the user attribute identification unit 406 retaining (obtaining) information of the number of consecutive logout processes for each user's identification information and changing the attribute information when the number reaches a defined value. The defined value can be appropriately set and can be changed according to the number of times of identification as the non-logged-out user.

The identification of the non-logged-out user by the user attribute identification unit 406 is executed by the determination unit 403 at each login process executed by the authentication unit 402. The forced logout processing unit 404 determines whether forced logout should take place, based on a result of the identification of the non-logged-out user by the determination unit 403. A procedure for the forced logout is described hereinafter, taking as an example a case in which private printing is registered as the particular process.

Figure 6:
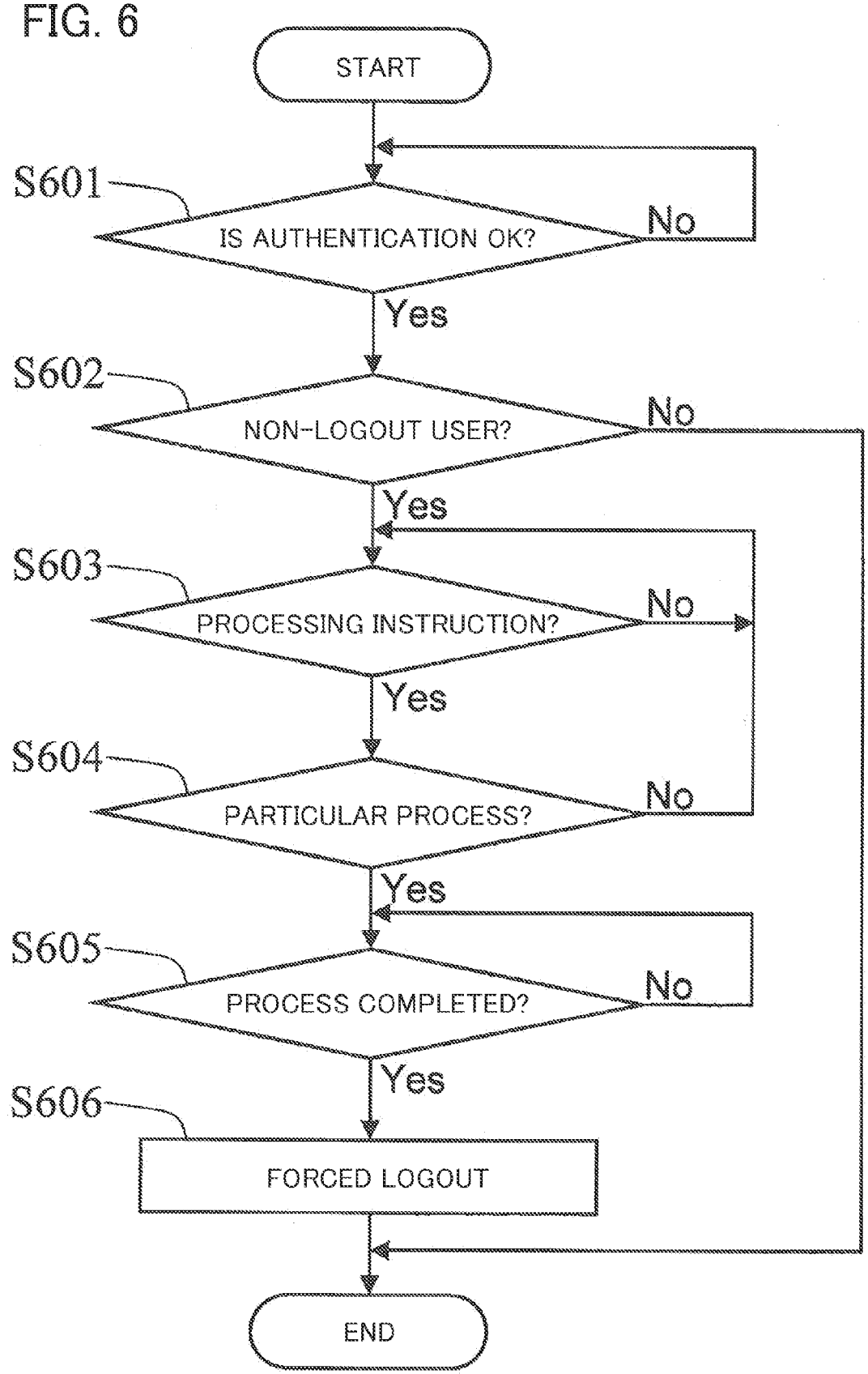
FIG. 6 is a flow diagram showing an example of a forced logout procedure executed by the multifunction peripheral according to the embodiment of the present invention.

FIG. 6 is a flow diagram showing an example of a forced logout procedure executed by the multifunction peripheral 100. The procedure is triggered by, for example, acquisition of identification information by the identification information input unit 401 (IC card reader 308) (Step S601 Yes).

In order to perform private printing, a user submits image data along with a password to the multifunction peripheral 100 from the user's information processing terminal. The image data is stored in a document box accessible only to the user. The document box is a storage area in the multifunction peripheral 100 that accumulates and manages document image data and the like. The document box is password-protected, in addition to the above-mentioned authentication by the identification information.

The user moves to an installation site of the multifunction peripheral 100 and inputs the identification information through the identification information input unit 401 of the multifunction peripheral 100. If the identification information thus input is included in the accessible user list, the authentication unit 402 executes the login process (Step S601 Yes). As described above, if the identification information input from the identification information input unit 401 is included in the accessible user list, the authentication unit 402 goes into a state of accepting operations by the user through the operation panel 200; and if the identification information is not included in the accessible user list, the authentication unit 402 is kept in a state of not accepting operations through the operation panel 200. In addition, if the identification information is included in the accessible user list, the authentication unit 402 inputs the identification information to the determination unit 403.

The determination unit 403 refers to the user attribute table stored in the user attribute storage unit 407 and determines whether the authenticated user (logged-in user) is the non-logged-out user or not (Step S602).

First, a case in which the authenticated user (logged-in user) is the non-logged-out user is described. If the determination unit 403 determines that the authenticated user (logged-in user) is the non-logged-out user, the determination unit 403 notifies the forced logout processing unit 404 of the result of determination. In response to the notification, the forced logout processing unit 404 monitors a processing instruction by the logged-in user via the operation recognition unit 411 (Steps S602 Yes, S603 No). In addition, the forced logout processing unit 404 monitors whether the processing instruction recognized by the operation recognition unit 411 is an execution instruction of a predefined (registered) particular process (Steps S603 Yes, S604).

Here, the authenticated user (logged-in user) accesses the document box by inputting an authentication password for accessing the document box through the operation panel 200, and instructs the multifunction peripheral 100 to execute a printing job of the image data submitted in advance. As described above, since the process (private printing) is the particular process registered in the determination unit 403, the forced logout processing unit 404 monitors completion of the process (printing job) through the operation control unit 412 (Steps S604 Yes, S605 No).

In response to the user's instruction to execute the printing job, the multifunction peripheral 100 prompts the user to input the password that is set for the printing job. When the user inputs the password to the multifunction peripheral 100, the multifunction peripheral 100 executes the printing job. Thereafter, the forced logout processing unit 404 instructs the authentication unit 402 to execute the logout process upon completion of the printing job in the private printing process, which is a particular process (Steps S605 Yes, S606).

As a result, when a non-logged-out user performs a particular process such as private printing, the non-logged-out user is automatically logged out upon completion of the processing. Therefore, the multifunction peripheral 100 can assuredly prevent a state in which the multifunction peripheral 100 is left with the password for accessing the document box being inputted and with any user being capable of accessing the document box, thereby maintaining confidentiality. In addition, since the forced logout is executed upon completion of the job, the multifunction peripheral 100 dose not execute a logout process during processing or user's operation, thereby not reducing operability.

On the other hand, in a case in which an authenticated user (logged-in user) is determined not to be the non-logged-out user by the determination unit 403, the procedure terminates (Step S602 No). In other words, if the logged-in user is not the non-logged-out user, the multifunction peripheral 100 does not execute a forced logout such as a logout process after execution of a printing job for private printing. As a result, the multifunction peripheral 100 can proceed to other processing.

In addition, in a case in which the processing instruction by a user is not an instruction of a particular process, the forced logout processing unit 404 continues monitoring of successive processing instructions (Steps S604 No, S603 No).

As described above, the multifunction peripheral 100 identifies the non-logged-out user and selectively executes a forced logout process for the user upon completion of a particular process. As a result, the multifunction peripheral 100 can prevent a reduction in confidentiality. In addition, the user is logged out upon completion of the particular process even if he/she wishes to successively perform a plurality of processes, so that he/she needs to log in for each process. Therefore, the multifunction peripheral 100 can remind particular users (non-logged-out users) of the logout process after use of the multifunction peripheral 100.

Alternatively, in the abovementioned configuration, identification as a non-logged-out user can be automatically cleared for a user who begins to instruct a logout process after using the multifunction peripheral 100.

It should be noted that the abovementioned embodiment is not intended to limit a technical scope of the present invention and various modifications and applications can be made in addition to the above description within the scope of the present invention. For example, although a configuration including the auto-clear processing unit, the user attribute identification unit, and the user attribute storage unit, has been described in the abovementioned embodiment, these are not essential components for the invention of the present application, and a non-logged-out user may be identified by other methods. For example, users newly registered to the accessible user list may be identified as non-logged-out users.

In addition, in the flow chart shown in FIG. 5, the order of the steps can be changed within a scope that provides a similar effect. For example, in FIG. 5, after determination of execution of auto-clear, determination of execution of a logout process is made; however, a similar effect can be provided by a configuration in which determination of execution of auto-clear is made only in a case in which the logout process has not been executed. It should be noted that Steps S504 and S505 for automatically clearing the identification of the non-logged-out user are not essential for the invention of the present application. In addition, in the flow chart shown in FIG. 6, the order of the steps can be changed within a scope that provides a similar effect.

Although a process that needs a security procedure by requiring a password for executing the process and the like has been exemplified as the particular process, other processes are also possible. For example, any process can be a particular process, although a configuration of automatically clearing identification as a non-logged-out user is not functional. Alternatively, the particular process can be different according to authority level assigned to each user.

In addition, in the above embodiment, the present invention is concretized as a digital multi-function peripheral; however, the present invention is not limited thereto and can be applied to any image forming apparatuses, such as printers, copy machines, and the like.

In addition, a configuration in which the multifunction peripheral as an image forming apparatus includes the identification information input unit, the authentication unit, the determination unit, and the forced logout processing unit has been described above; however, the present invention can be an image forming system in which these units are appropriately configured as separate components that are connected by a network or the like. For example, a configuration in which an authentication device including the authentication unit, the determination unit and the forced logout processing unit is separately configured from an image forming apparatus and an identification information input device to which identification information for identifying a user is input can provide a similar effect to the multifunction peripheral of the abovementioned embodiment. In such an image forming system, for example, a common authentication device can be provided for a plurality of image forming apparatuses. In addition, it is possible to provide only the authentication device.

The present embodiment can prevent reduction in confidentiality due to non-logged-out users and can remind non-logged-out users to execute a logout process after use of the apparatus. The present invention can be preferably applied to an image forming apparatus, an image forming system and an authentication device.

What is claimed is:

1. An image forming apparatus comprising:
   a processing unit that executes a plurality of processes;
   an identification information input device where identification information for identifying a user is inputted;
   an authentication application unit that can execute a login process and a logout process, the authentication application unit executing the login process in a case in which the identification information input through the identification information input device fulfills a predefined authentication condition;
   an operation panel that receives an instruction for the logout process from the user;
   a user attribute storage application unit that stores the identification information of a non-logged-out user, who is a particular user among users that have not given the instruction for the logout process through the operation panel;
   a determination application unit that determines whether a logged-in user, who is the user for whom the login process is executed by the authentication application unit, is the non-logged-out user, based on the identification information stored in the user attribute storage application unit;
   a forced logout application unit that, in a case in which the logged-in user is determined to be the non-logged-out user by the determination application unit, instructs the authentication application unit to execute the logout process when a predefined particular process among the plurality of processes is executed and completed by the processing unit;
   an operation recognition application unit that recognizes operation content received by the operation panel;
   an auto-clear application unit that monitors operations by the logged-in user through the operation recognition application unit, and instructs the authentication application unit to execute the logout process when a predetermined specific time period has elapsed without an input to the operation panel; and
   a user attribute identification application unit that identifies the non-logged-out user based on: information relating to a state of the login process and the logout process and the identification information of the logged-in user from the authentication application unit, information relating to the operation content from the operation recognition application unit, and information relating to execution of an auto-clear process from the auto-clear application unit,
   wherein the user attribute identification application unit identifies: the logged-in user as the non-logged-out user in a case in which a detected operation is performed by the user different from the logged-in user after the login process is executed by the authentication application unit and before the logout process is executed by the authentication application unit based on an instruction from the auto-clear application unit; and the logged-in user as the non-logged-out user in a case in which identification information firstly input to the identification information input device is identification information for the user different from the logged-in user at the beginning of the logout process after executing the logout process by the authentication application unit based on the instruction from the auto-clear application unit, and wherein the user attribute storage application unit stores a result of identification by the user attribute identification application unit in correspondence with the identification information.

2. The image forming apparatus according to claim 1, wherein, in a case in which the logout process is repeated for a predefined number of times by an operation of the user recorded as a non-logged-out user in the user attribute storage application unit, without the logout process by the authentication application unit based on the instruction from the auto-clear application unit being executed, the user attribute identification application unit identifies the user as not being the non-logged-out user and changes the result of identification that has been stored in the user attribute storage application unit in correspondence with the identification information.

3. The image forming apparatus according to claim 1, wherein the particular process is a private printing process.

4. An image forming system comprising:
a processing device that executes a plurality of processes;
an identification information input device where identification information for identifying a user is inputted; and
an authentication device including:
an authentication application unit that can execute a login process and a logout process, the authentication application unit executing the login process in a case in which the identification information input through the identification information input device fulfills a predefined authentication condition;
an operation panel that receives an instruction for the logout process from the user;
a user attribute storage application unit that stores identification information of a non-logged-out user, who is a particular user among users that have not given the instruction for the logout process through the operation panel;
a determination application unit that determines whether a logged-in user, who is the user for whom the login process is executed by the authentication application unit, is the non-logged-out user based on the identification information stored in the user attribute storage application unit;
a forced logout application unit that, in a case in which the logged-in user is determined to be the non-logged-out user by the determination application unit, instructs the authentication application unit to execute the logout process when a predefined particular process among the plurality of processes is executed and completed by the processing device;
an operation recognition application unit that recognizes operation content received by the operation panel;
an auto-clear application unit that monitors operations by the logged-in user through the operation recognition application unit, and instructs the authentication application unit to execute the logout process when a predetermined specific time period has elapsed without an input to the operation panel; and
a user attribute identification application unit that identifies the non-logged-out user based on: information relating to a state of the login process and the logout process and the identification information of the logged-in user from the authentication application unit, information relating to the operation content from the operation recognition application unit, and information relating to execution of an auto-clear process from the auto-clear application unit, wherein the user attribute identification application unit identifies: the logged-in user as the non-logged-out user in a case in which a detected operation is performed by the user different from the logged-in user after the login process is executed by the authentication application unit and before the logout process is executed by the authentication application unit based on an instruction from the auto-clear application unit; and the logged-in user as the non-logged-out user in a case in which identification information firstly input to the identification information input device is identification information for the user different from the logged-in user at the beginning of the logout process after executing the logout process by the authentication application unit based on the instruction from the auto-clear application unit, and wherein the user attribute storage application unit stores a result of identification by the user attribute identification application unit in correspondence with the identification information.

5. The image forming system according to claim 4, wherein, in a case in which the logout process is repeated for a predefined number of times by an operation of the user recorded as the non-logged-out user in the user attribute storage application unit, without the logout process by the authentication application unit based on the instruction from the auto-clear application unit being executed, the user attribute identification application unit identifies the user as not being the non-logged-out user and changes the result of identification that has been stored in the user attribute storage application unit in correspondence with the identification information.

6. The image forming system according to claim 4, wherein the particular process is a private printing process.

7. An authentication device comprising:
an identification information input device where identification information for identifying a user is inputted;
an authentication application unit that can execute a login process and a logout process, the authentication application unit executing the login process in a case in which the identification information input through the identification information input device fulfills a predefined authentication condition;
an operation panel unit that receives an instruction for the logout process from the user;
a user attribute storage application unit that stores the identification information of a non-logged-out user, who is a particular user among users that have not given the instruction for the logout process through the operation panel;
a determination application unit that determines whether a logged-in user, who is the user for whom the login process is executed by the authentication application unit, is the non-logged-out user, based on the identification information stored in the user attribute storage application unit;

a forced logout application unit that, in a case in which the logged-in user is determined to be the non-logged-out user by the determination application unit, instructs the authentication application unit to execute the logout process when a predefined particular process among the plurality of processes is executed and completed by an apparatus subjected to authentication;

an operation recognition application unit that recognizes operation content received by the operation panel;

an auto-clear application unit that monitors operations by the logged-in user through the operation recognition application unit, and instructs the authentication application unit to execute the logout process when a predetermined specific time period has elapsed without an input to the operation panel; and a user attribute identification application unit that identifies the non-logged-out user based on: information relating to a state of the login process and the logout process and the identification information of the logged-in user from the authentication application unit, information relating to the operation content from the operation recognition application unit, and information relating to execution of an auto-clear process from the auto-clear application unit, wherein the user attribute identification unit identifies: the logged-in user as the non-logged-out user in a case in which a detected operation is performed by the user different from the logged-in user after the login process is executed by the authentication application unit and before the logout process is executed by the authentication application q unit based on an instruction from the auto-clear application unit; and the logged-in user as the non-logged-out user in a case in which identification information firstly input to the identification information input device is identification information for the user different from the logged-in user at the beginning of the logout process after executing the logout process by the authentication application unit based on the instruction from the auto-clear application unit, and wherein the user attribute storage application unit stores a result of identification by the user attribute identification application unit in correspondence with the identification information.

8. The authentication device according to claim 7, wherein, in a case in which the logout process is repeated for a predefined number of times by an operation of the user recorded as the non-logged-out user in the user attribute storage application unit, without the logout process by the authentication application unit based on the instruction from the auto-clear application unit being executed, the user attribute identification application unit identifies the user as not being the non-logged-out user and changes the result of identification that has been stored in the user attribute storage application unit in correspondence with the identification information.

9. The authentication device according to claim 7, wherein the particular process is a private printing process.

* * * * *